Jan. 1, 1952   R. W. PITMAN   2,581,138
TORPEDO DIRECTOR

Filed May 8, 1946   8 Sheets-Sheet 1

Inventor
RICHARD W. PITMAN

By
Attorney

Jan. 1, 1952 — R. W. PITMAN — 2,581,138
TORPEDO DIRECTOR

Filed May 8, 1946 — 8 Sheets-Sheet 2

Inventor
RICHARD W. PITMAN
By
Attorney

Jan. 1, 1952     R. W. PITMAN     2,581,138
TORPEDO DIRECTOR

Filed May 8, 1946     8 Sheets-Sheet 3

Inventor
RICHARD W. PITMAN
By
Attorney

Inventor
RICHARD W. PITMAN

Jan. 1, 1952  R. W. PITMAN  2,581,138
TORPEDO DIRECTOR
Filed May 8, 1946  8 Sheets-Sheet 5

Inventor
RICHARD W. PITMAN
By
Attorney

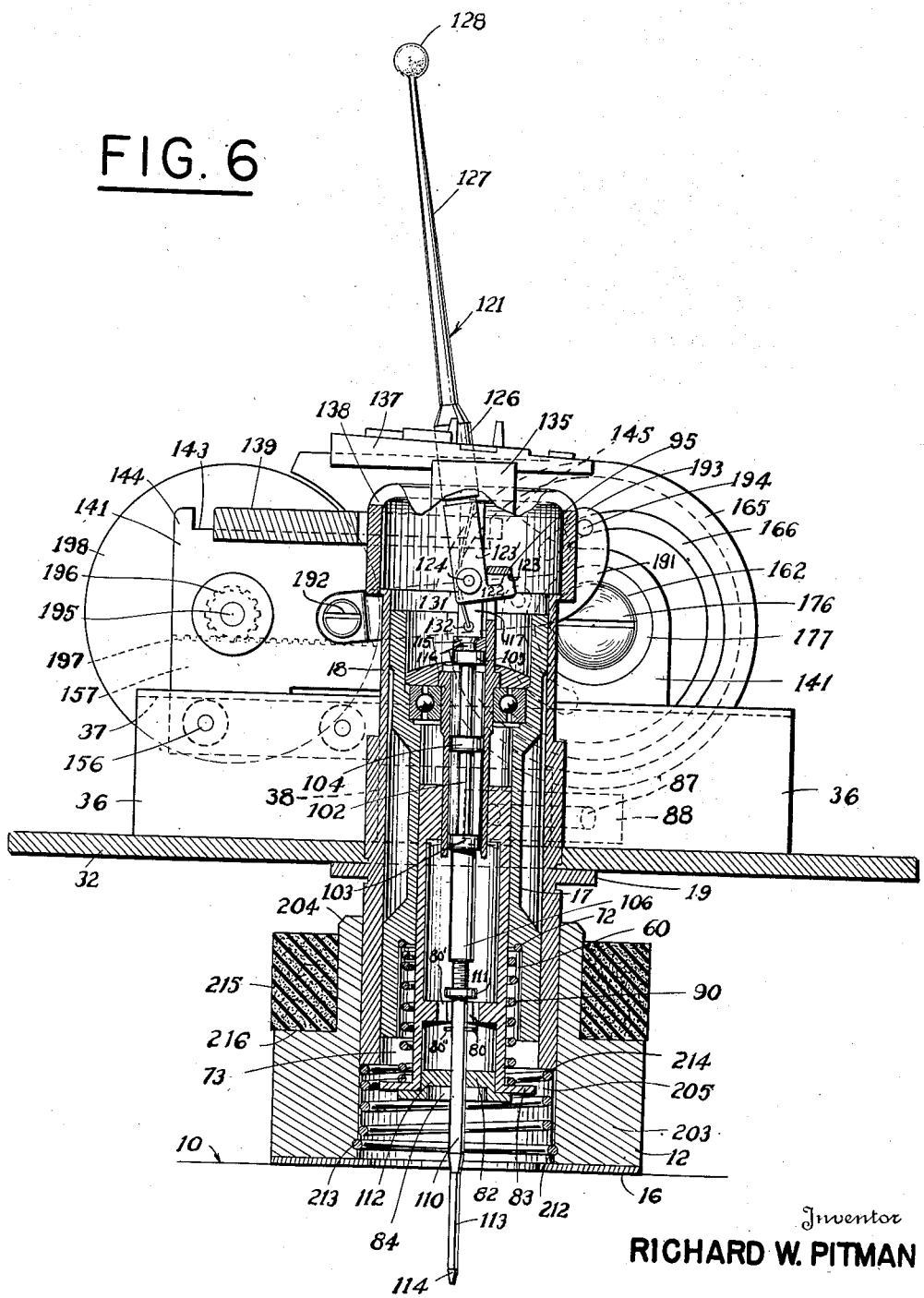

Jan. 1, 1952

R. W. PITMAN 2,581,138

TORPEDO DIRECTOR

Filed May 8, 1946

Inventor
RICHARD W. PITMAN

Patented Jan. 1, 1952

2,581,138

UNITED STATES PATENT OFFICE 2,581,138

TORPEDO DIRECTOR

Richard W. Pitman, Philadelphia, Pa., assignor to the United States of America as represented by the Secretary of the Navy Application May 8, 1946, Serial No. 668,026

6 Claims. (Cl. 33—46.5)

The present invention relates to torpedo directors and, in particular, to such directors adapted for use in aircraft.

Up to the present time in torpedo directors, the solution of the vector triangle known as the torpedo triangle has been accomplished on an angle solver. Into the angle solver is introduced torpedo speed, target speed, and target angle, which is the bearing of the aircraft from the target's course at the instant of release. Several disadvantages are inherent in the methods now used. The pilot operating the torpedo director must estimate the target angle at which he wishes to drop the torpedo and set this target angle on the director. He must also estimate the target's speed and place this into the director, the torpedo speed being known in advance. In order to secure a hit, it is necessary that the plane using these directors be at the proper target angle relative to the target ship at the instant of drop. If, because of anti-aircraft fire or other circumstances beyond the control of the pilot, the firing plane is unable to reach this predetermined target angle, or if the pilot makes a mistake in estimating the target angle, a miss will result.

The prior gyro-controlled instruments for determining the correct firing angle have been used with excellent results on surface and submersible water craft, and the accurate setting of these instruments is possible due to the low rate of speed at which the surface and submersible craft travel, thereby affording the operator considerable time to make numerous mathematical calculations, the results of which may then be set into the mechanism. Due to the high rates of speed of dive bombers and other torpedo launching aircraft, the existing instruments are not adaptable to such craft. With the innovation of aircraft torpedo dive bombing, an urgent need for a gyro controlled firing sight confronted the designers, one that would require a minimum of adjustment and permit elimination of the usual time consuming mathematical calculations, and an instrument that would enable the pilot of such aircraft to first set his sights at the desired firing angle preliminary to making his bomb run while traveling at a high rate of speed and, secondly, to make corrections for change in direction or speed of target, should the target change its course or speed after the pilot has started his bomb run.

It is an object of the present invention to provide an improved torpedo firing sight adapted to be controlled by the usual airplane directional gyro while the airplane is traveling at a high rate of speed.

A further object of the present invention is the provision of an improved torpedo director into which the target angle is continuously and automatically introduced by stabilizing in azimuth that portion of the torpedo triangle known as the target course and speed vector.

A further object of the present invention is the provision of a torpedo director that is instantly adjustable to compensate for variations in average torpedo speed for any particular conditions taking into account its airborne travel as affected by a last minute change in aircraft speed or in altitude at which the torpedo is to be dropped.

A further object of the present invention is the provision of an improved director with means to enable alignment of the target vector in the director with the target course.

A further object of the present invention is the provision of means for adjusting the rear sight in accordance with target speed, predetermined torpedo run, aircraft speed and altitude at time of firing.

Other objects and advantages will become apparent as the description proceeds and is taken in connection with the accompanying drawings wherein like characters of reference designate corresponding parts throughout the several views, and wherein:

Fig. 1 is a front perspective view in perspective of the improved torpedo director with cover removed and showing the director associated with a modified directional gyroscope, the solid line circular arrows indicating the path of the rear sight in its sighting movement in either direction, the dotted and dot-and-dash lines and arrows indicating the circles described when the rear sight arm is in two other positions of angular adjustment.

Fig. 6 is a view of the gyro adaptor and the torpedo director, partly in rear elevation and partly in vertical transverse section.

Figure 1:
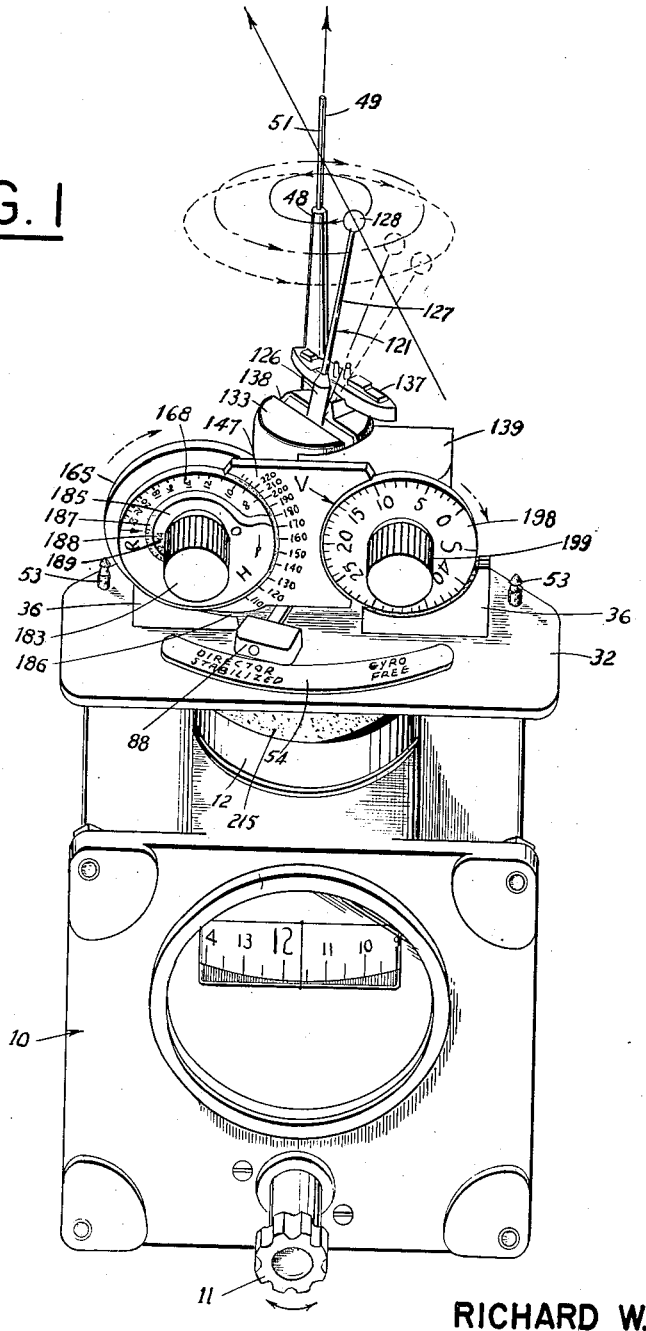

The torpedo director shown in Fig. 1 is a mechanical instrument which gives the torpedo pilot a means for finding the course on which he should release. To do this it receives estimates of target course and speed, as well as information to correct for the airborne torpedo run, and provides continually a computed line of sight. If the aircraft is so maneuvered that this line of sight passes through the target, then the "lead" is correct and release may occur. During such maneuvers it is normally unnecessary to correct the setting of target course, since this setting is automatically "stabilized" and is unaffected by reasonable motion of the aircraft.

The instrument attaches to a modified directional gyro 10, when the latter is available in an appropriate position, and draws from that instrument the stability-in-azimuth required to store the target course, once estimated. Connection to the gyro, in its installed position, is made by means of a bayonet joint and an adaptor 12 built on the gyro case. A manual clutch 88 is provided, which, when disengaged, severs completely the operative connection between director and gyro gimbal.

The computed line of sight (the "output" of the director) is determined by the relative position of a ball-and-post combination atop the instrument.

In the operation of the torpedo director, the following instructions are meant merely to suggest a workable sequence of operations in the use of the director. They should not be interpreted in any degree as tactical doctrine.

When an attack is to be made, the torpedo plane will be initially at some distance from the target and presumably the gyro will be in use as a directional indicator. The plastic dust cover 55 on the director should first be removed by a straight vertical lift, without allowing it to bump the sight members. The next step in the attack is to throw the clutch lever 88 (see Fig. 1) all the way to the left. The gyro should next be caged by pushing knob 11 in.

The speed and course of the target, if available, may next be incorporated. Target speed is set directly on the right-hand dial by means of knob 199. The target course is set by rotating the gyro caging knob 11 while pushed in, until the ship model is aligned parallel with the target, and with the same heading. The gyro is then immediately uncaged by pulling knob 11 out; and the course or heading of the target will automatically be stabilized. If, while preparing for the run, the target speed or course should differ from the values inserted, they may be reset without interfering with any other settings.

It is advisable to determine in advance at what altitude the torpedo will be released, and to set the altitude dial (H) to that value as soon as possible. It is much easier to alter the values of torpedo run or airplane speed after the attack has been started, than it is to change the altitude setting. Altitude is set, by a pull-turn operation of the left-hand knob 183, against the index arrow of the altitude scale. Similarly, likely values of the torpedo run and airplane speed, for the moment of release, should be inserted, using the knob 183 to set the proper values on the corresponding scales 173 and 154 against one another.

The director with values set in and stabilized by the gyro is maintaining the course of the target. If the attack can be made as planned, the procedure is now simple. The target may be aligned with the sight ball and post merely by flying the plane in the appropriate direction. In the face of serious enemy resistance, the torpedo plane may be maneuvered in any necessary manner while approaching in a general way the desired release point. The director will still indicate the solution of the preset collision problem, whenever the sights align upon the target.

As the torpedo plane closes the range to reach the set value of the torpedo run, the set altitude and speed should be attained as quickly as possible. The course of the target may now be checked with the ship model and, if necessary, a last adjustment may be made.

When the proper release point has been reached, the target should be lined up with the sights. The axis of the plane and hence the torpedo will then be directed toward the collision point, and the torpedo may be released.

Figures 8, 9:
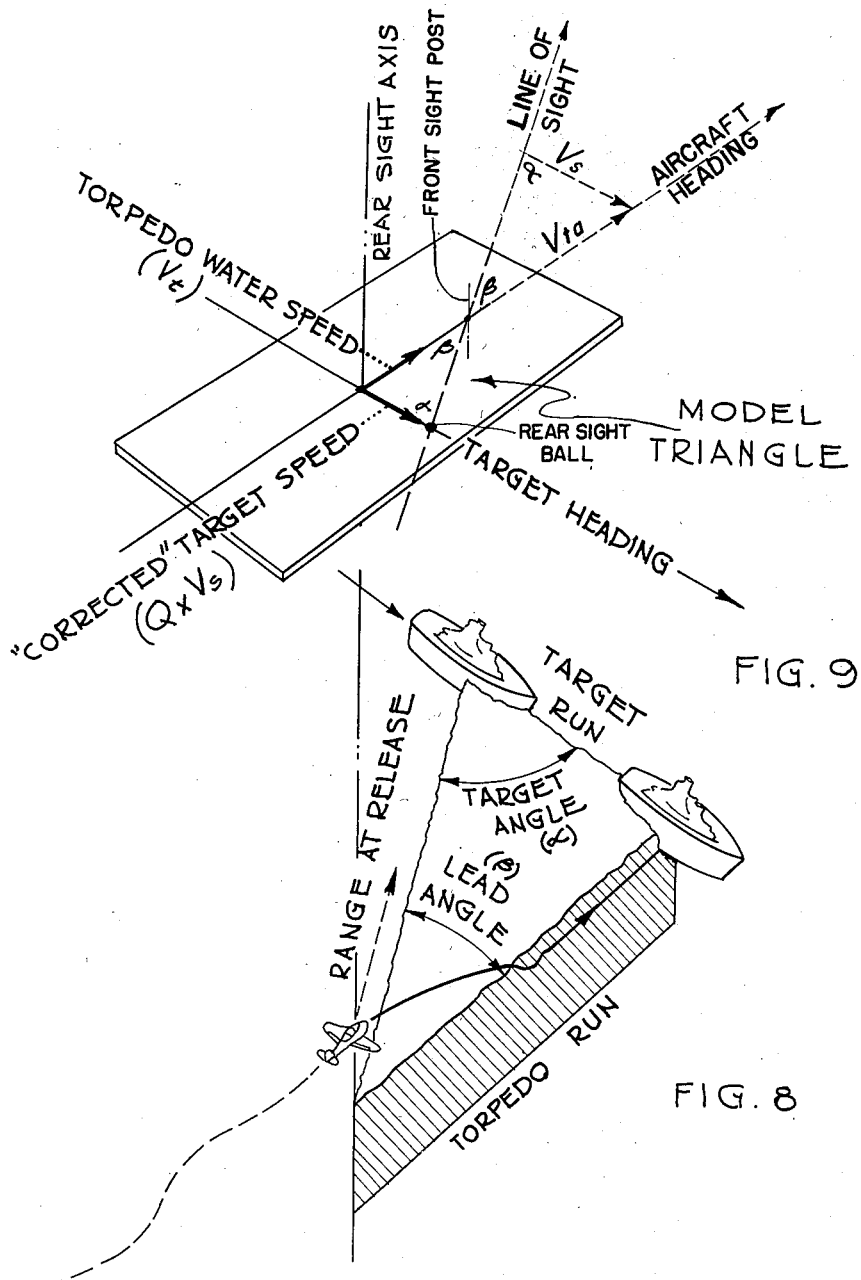
Fig. 8 is a diagrammatic perspective view showing a triangular slice of the ocean and the triangular relations of the target run, the torpedo run and the range of release in an illustrative example of torpedo firing problems.
Fig. 9 is a diagrammatic perspective view of a model triangle corresponding to the triangle illustrated in Fig. 8 and showing the relations of the corrected target speed, torpedo water speed and the line of sight.

The following is a condensed theoretical discussion of the conditions prerequisite for a torpedo hit. The distances covered, during the total time from release to collision, by the torpedo and a uniformly moving target are simply their speeds multiplied by that time. Hence the distances themselves are proportional to the corresponding speeds. As seen in Fig. 8, where a triangular slice of ocean is shown, these same distances, together with the range along the line of sight at release, must form a triangle; and hence by the law of sines $$\frac{\sin (\text{lead angle})}{\sin (\text{target angle})} = \frac{\text{target run}}{\text{torpedo run}}$$

but these runs, or distances, have been shown to be proportional to the corresponding speeds; thus $$\frac{\sin (\text{lead angle})}{\sin (\text{target angle})} = \frac{\text{target speed}}{\text{torpedo speed}}$$

The torpedo may be said roughly to follow a fixed course, determined by the aircraft heading at release; but its speed is far from constant since its run is divided between air and water. Thus for the torpedo speed an average value must be used, which may be derived from: torpedo water speed; aircraft speed and altitude (in horizontal flight); and torpedo run (for which range at release may, as a practical matter, generally be substituted). Conversion from torpedo water speed, which is a known property of the torpedo to torpedo (average) speed may be made by dividing the first by a "correction"

Q, which involves principally the torpedo run and the aircraft speed and altitude at release. Instead of the last formula, then $$\frac{\sin(\text{lead angle})}{\sin(\text{target angle})} = \frac{\text{target speed} \times Q}{\text{torpedo water speed}}$$

The easiest way to solve this equation and to obtain the proper lead angle is to set up a model triangle in a horizontal plane, which will simulate the real triangle of Fig. 8 and in which the appropriate sides and angles will be in accord with the above formula. It is evident from the above formula that the torpedo water speed itself may be used as one side of this triangle if the side corresponding to target speed has been modified through multiplication by the correction Q described above. Such a model triangle is shown in Fig. 9, where the side corresponding to torpedo water speed is held in the direction of the aircraft, and the side corresponding to the (modified) target speed is aligned as the heading of the target. The similarity of the model triangle to the real space triangle, in spite of the interchange of the positions of corresponding sides, is evident from a comparison between Figs. 8 and 9. In particular, it is seen that the lead angle $\beta$ is completely determined by this method.

Thus, it may be seen that a model speed-triangle can be used to solve the torpedo release problem. One side of the triangle is made proportional to the torpedo water speed and is fixed in the heading of the aircraft. Another side is made proportional to the estimated target speed, corrected by a multiplier Q, and is set parallel to the target heading and stabilized. The third, or remaining, side of the triangle provides a line of sight, which, if made to pass through the target by choosing the appropriate aircraft heading, automatically assures that that heading is satisfactory for release.

The correction Q compensates for the airborne run of the torpedo, and may be shown to be correctly accomplished through a fractional reduction in the length of the target speed vector. This fractional reduction must be directly proportional to the square root of altitude, inversely proportional to the torpedo run, and directly proportional to the difference between airplane speed and torpedo water speed.

To show how the complete solution is carried out mechanically within the director, it is necessary to show how the primary information set into the instrument is utilized to produce the ultimate line of sight.

Figure 10:
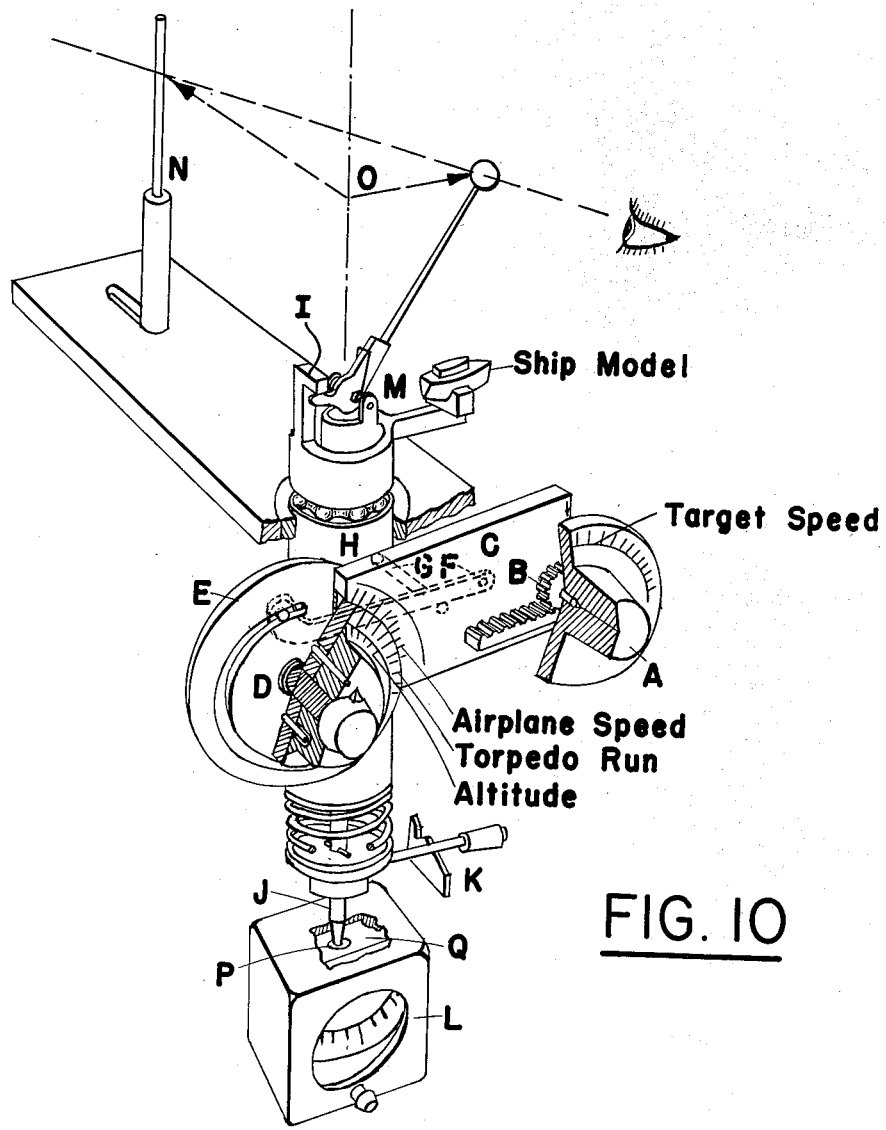
Fig. 10 is a fragmentary perspective view of the director and gyro showing the automatic computing mechanism for positioning the rear sight ball in the proper relation with respect to the front sight.

In Fig. 10, the target speed dial A rotates the pinion B which moves the plate C by an amount corresponding to uncorrected target speed. At the left-hand side of the plate C, a stack of dials D, for setting in altitude, airplane speed, and torpedo run, computes the fractional reduction mentioned above, and delivers it as a rotation to the cam plate E, the radius of whose cam slot at any point controls the slope of the cam-follower arm F pivoted on plate C. Bearing against the lower edge of this arm F is a pin G whose vertical position is a measure of the corrected target speed.

The position of pin G ultimately controls the vertical position of rotatable piston H and therefore also of a small overhanging platform I at the top of that piston. A small lever rigidly attached to the bottom end of the ball boom M bears on the under side of this overhanging platform.

The ball boom M is independently pivoted on a horizontal axis attached to the stem J which sits in a socket in the gimbal of gyro L. By means of the clutch K, this friction connection between gyro and director stem may be severed.

As pin G rises or falls, due to the positioning imposed by rotation of the correction-cam E and of the target speed pinion B, the ball boom M will be forced by the platform I to assume a position such that the horizontal displacement from the extended axis of the stem to the center of the sight ball represents the properly "corrected" target speed.

This target speed displacement, or vector, is positioned in space by caging and rotating the gyro with the clutch K engaged; the torpedo speed vector is represented in direction by the axis of the airplane and in amount by the distance between the sight post N and the zero position of the ball boom M (which is the extended axis of the stem J).

The target speed vector and the torpedo speed vector have now been combined properly as shown by the triangle at O, and when the target is lined with the sights the axes of the airplane and torpedo are directed toward the collision point.

This torpedo director is used with a directional gyro which has been modified in such a way that a connection to the vertical gimbal may be effected through the top of the gyro case as shown in Fig. 10. When made available as a standard directional instrument this gyro simply has a cover over the opening in the top of its case. An adaptor housing 12 forming the external part of a bayonet joint and carrying a pneumatic connection 208, replaces this cover when the gyro is to be used with the torpedo director. A new gasket, supplied as part of the equipment, should be used whenever such a replacement is made.

Figure 2:
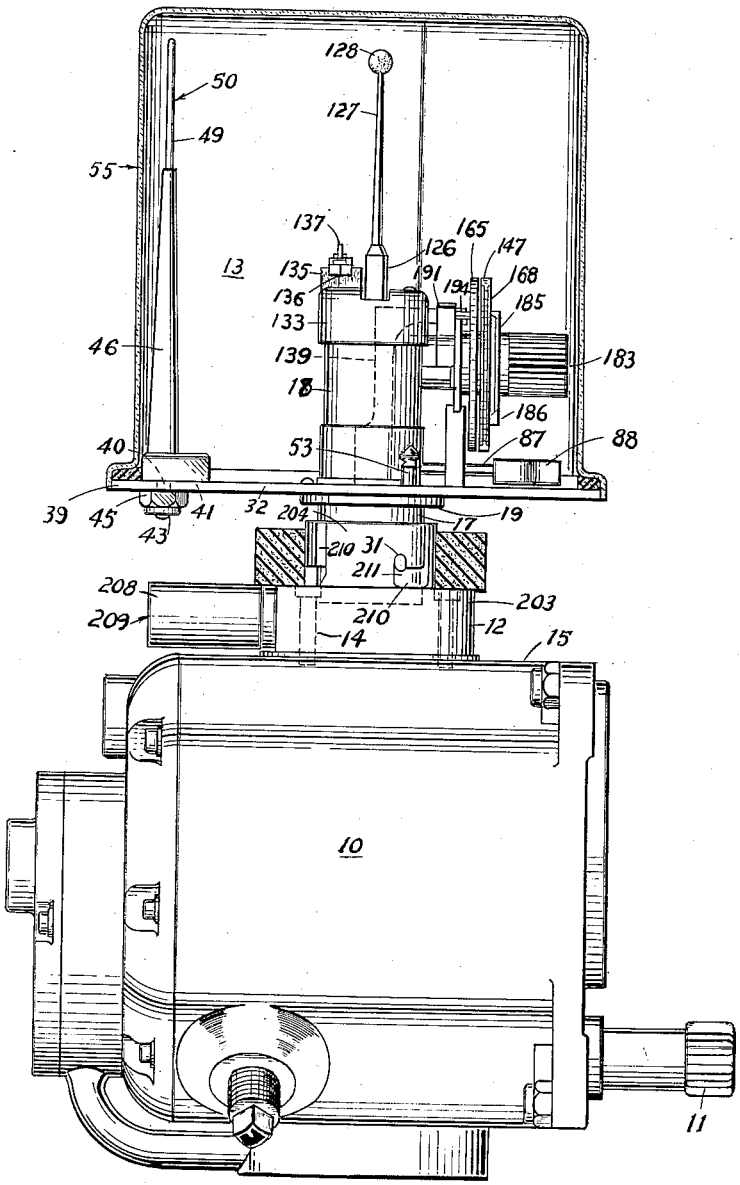
Fig. 2 is a side elevational view of the torpedo director and gyroscope, the cover and certain other parts being shown in section.
Figure 11:
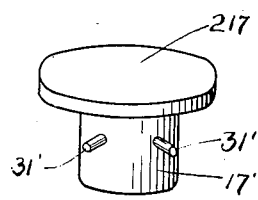
Fig. 11 is a perspective view of a closure cap for the adaptor.

To the gyro with adaptor housing may be fitted either the director equipment, as best seen in Fig. 2, or the replacement cap 217, Fig. 11. A sponge-rubber washer 215, shown in Figs. 2, 4, 5 and 6, is placed around the neck of the adaptor housing in either case. The replacement cap 217 may be substituted for the director when the latter is not in use.

Whenever the director is connected to or disconnected from the gyro, that is to say whenever the bayonet joint is engaged or disengaged, it is recommended that the plastic dust cover 55 be placed on the director component for facility in handling. With regard to the dust cover a word or two of caution is in order. Whenever the cover is placed on the director, the clutch lever 88 (see Fig. 1) should be thrown all the way to the right: to the "gyro free" position. In attaching or removing the cover, care should be exercised so as not to strike the members of the sighting system.

Before attaching (detaching) the director component to (from) the gyro, by means of the bayonet joint, the target speed dial 198 (Fig. 1) should be set at 40 knots and the clutch lever shifted to its extreme right position. The director is attached to the gyro by inserting the bayonet joint into the adaptor housing in such a way that the bayonet pins enter the corresponding slots in the housing.

Dust and dirt are the principal enemies of the director; the plastic dust cover should always be clipped to the director when the latter is not in use. When the director is removed from the gyro, the gyro should be covered to prevent entry of dust and dirt through the bayonet joint; and the replacement cap 217 (with sponge rubber washer 215) should be kept in the adaptor on the gyro.

As to the effect of the director on the performance of the gyro, it should first be remarked that there is no physical connection between the two when the clutch lever 88 (Fig. 1) is thrown to the right. Even with the director clutched in, clutch lever to the left, it should be next to impossible to observe any loading of the gyro. With the director thus "stabilized," it should be possible to make at least two complete 2-minute turns without causing excess drift of the gyro card. If a director loads the gyro appreciably it is mechanically in disrepair and should not be used.

Going back to the construction of the mechanism for reproducing the model triangle in the director, and referring to Fig. 9, the shape and cooperation of the adjusting parts is based on the following considerations. As already briefly explained, the equation of the actual speed triangle may be written $$\sin \beta = \frac{V_s}{V_{ta}} \sin \alpha \qquad (1)$$

where $V_s$ is the target speed vector, and $V_{ta}$ is the vector of the average torpedo speed on its run through the air as well as through the water. The effects of wind and air resistance on the torpedo, being negligible, are disregarded. It is also assumed that the rated water speed of the torpedo is attained instantly upon entering the water, and is maintained throughout the remainder of the run.

In the model triangle the distance between the axes of the front and rear sights is fixed in accordance with the torpedo water speed, and to make corrections for the airborne travel of the torpedo to arrive at the proper line of sight, a correction factor may be applied to the target speed vector instead of the torpedo speed vector according to the following calculations:

The torpedo run $$KR = V_{ta}T = V_aT_f + V_t(T - T_f) \qquad (2)$$

where K is a constant to reconcile the units, T is the total time for torpedo run, $T_f$ the time for airborne torpedo run (time of flight through the air), $V_t$ is the torpedo water speed and $V_a$ is the airplane air speed.

From (2):

$$KR = V_tT + T_f(V_a - V_t)$$

Transposing the first terms on each side of the equation and dividing through by (−KR):

$$\frac{V_tT}{KR} = \frac{KR}{KR} - \frac{T_f(V_a - V_t)}{KR}$$

Substituting ($V_{ta}T$) for KR in the left side of the equation and simplifying:

$$\frac{V_t}{V_{ta}} = 1 - \frac{T_f}{KR}(V_a - V_t) \qquad (3)$$

Or, since the time of flight of the torpedo $T_f$ is merely the fall-time from altitude H, $$T_f = \sqrt{\frac{2H}{g}}$$

then, from (3):

$$\frac{V_t}{V_{ta}} = 1 - \frac{\sqrt{H}}{K'R}(V_a - V_t)$$

which is the correction factor Q where K' is a dimension-constant different from K. If K' is evaluated for the value of $g$ in feet/sec.$^2$, and for the units of the variables in knots for the speeds and feet for altitude, we have $$\frac{V_t}{V_{ta}} = 1 - \frac{\sqrt{H}}{7.12R}(V_a - V_t)$$

Multiplying the right hand side of Equation 1 by $$\frac{V_t}{V_t}$$

$$\sin \beta = \frac{V_s}{V_t} \cdot \frac{V_t}{V_{ta}} \sin \alpha$$

So that if a fictitious "corrected" target speed $$V_s\left[1 - \frac{\sqrt{H}}{7.12R}(V_a - V_t)\right] = V_sQ$$

is inserted for target speed (1), then the average torpedo speed $V_{ta}$ may be replaced by torpedo water speed $V_t$.

In the airborne correction dials of the mechanism, only H, R, $V_a$ are set in. $V_t$ as already mentioned is a constant of the apparatus and is set for 40 knots in the device shown.

Referring again to the drawings, the numeral 11 designates a knob connected in a standard manner to cage and uncage the gyro by a push-pull motion, and to adjust the gyro in azimuth when caged, by a turning motion. The adaptor 12 is secured to the gyroscope 10 by screws 14 shown in dotted lines in Fig. 2 of the drawings. Interposed between the top of the gyroscope casing 15 and the adaptor 12 is a gasket 16.

Figure 5:
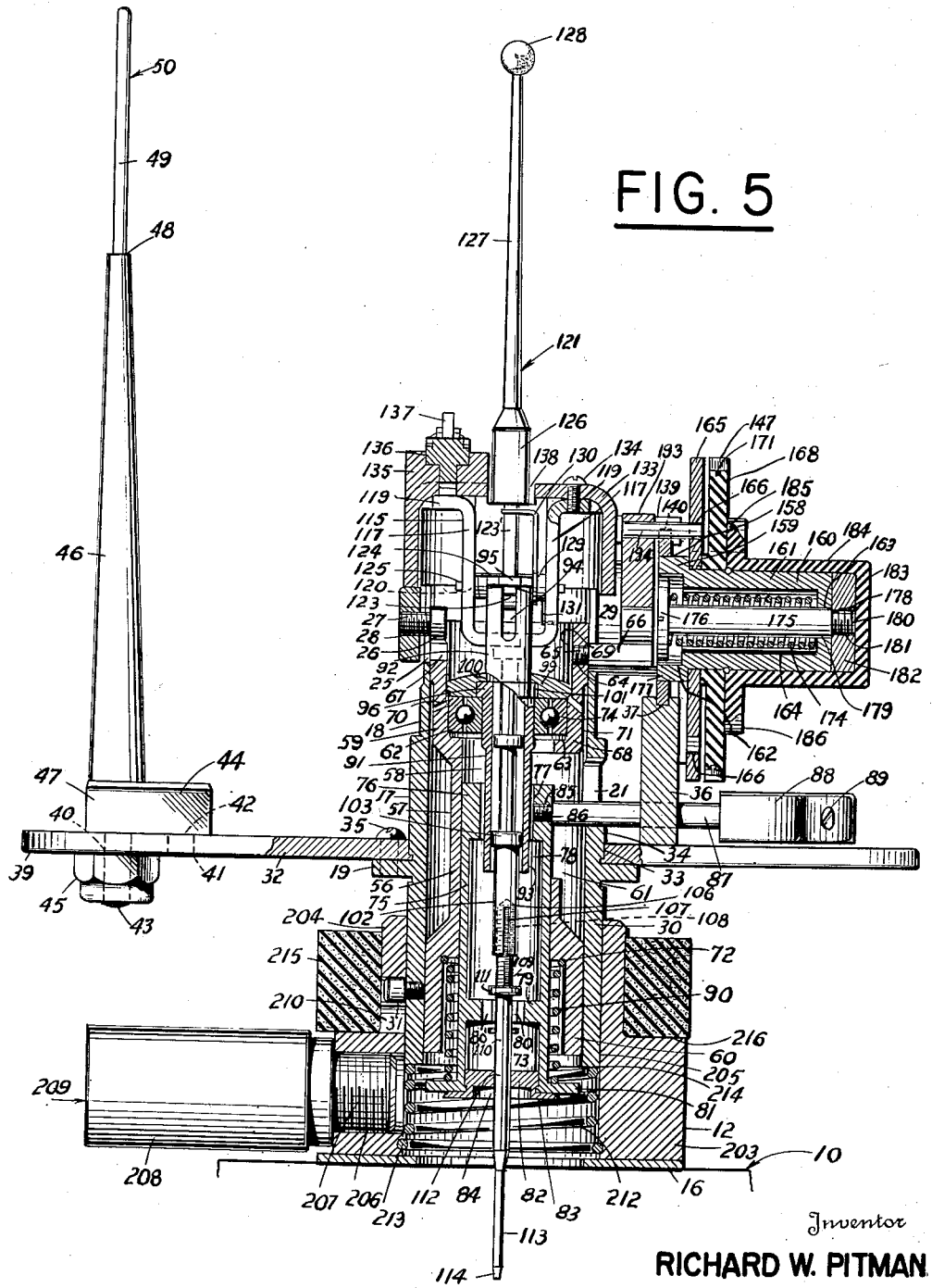
Fig. 5 is a view of the gyro adaptor and the torpedo director, partly in left side elevation and partly in central vertical longitudinal section.

The torpedo director 13 comprises a cylindrical housing member 17 in which are mounted certain operating mechanisms to be enumerated and described in detail hereinafter. The housing member 17 has a reduced portion 18 and an integral flange 19. In the wall of the cylinder 17 there is provided an opening in the form of a cam slot 21, the lower wall 22 of the cam slot 21 being disposed at an angle and of irregular configuration and having recesses 23 and 24 for a purpose to be later described. Extending downwardly from the top of the cylinder 17, in the wall of the reduced portion 18 is a slot 25 that receives an adjustable stop 26 having a threaded shank 27 that is engaged by a nut 28 that secures the stop in an adjusted fixed position, and diametrically opposite the slot 25 is a slot 29. The lower portion 30 of the cylinder 17 is provided with studs 31 that may be integral with the wall of the cylinder or, as shown in Fig. 5, they may be threaded into the wall of the cylinder.

Mounted upon the flange 19 is a plate 32 of substantially triangular configuration that is provided with a central opening 33 of a diameter to snugly engage the peripheral wall 34 of the housing 17. The plate 32 is fixedly secured to the flange 19 by screws or rivets 35. Upon the plate 32 and secured thereto by any suitable means is a bar member 36 having a trackway groove 37 and an oblong opening 38. Adjacent the apex 39 of the plate 32, there are provided apertures 41 and 40 that receive interchangeably a lug 42 and a screw threaded shank 43 that depend from a block 44 as indicated by dotted lines in Figs. 2 and 5. The block 44 is rigidly secured to the plate 32 by a nut 45 that engages the threaded shank 43. Superposed upon the block 44 and secured thereto by any suitable means is a tapered front sight post 46, a portion of the base of the post being approximately uniplanar with the wall 47 of the block 44. The tapered portion of the front sight extends to a point represented by the numeral 48 and at this point the post is of a reduced size and of a uniform diameter at 49, and may be of any suitable length, the portion 50 being provided with a white sight line 51 and a companion line diametrically opposite the line 51. On the plate 32 adjacent one side wall of the block 44 there are provided numerical indicia 52 for a purpose to be later described. The plate is also provided with studs 53 and an indicia plate 54, the studs engaging clips (not shown) that are secured to the inner walls of a protective translucent cover 55 shown in Fig. 2 of the drawings.

Mounted for slidable movement within the housing 17 is a sleeve 56 having a restricted portion 57, a bore 58 and enlarged end portions 59 and 60. The restricted portion 57 is provided with an opening 61 for a purpose to be later described. The end portion 59 is provided with a bore 62 of greater diameter than the bore 58, to form a seat 63. In the wall of the end portion 59 is a threaded aperture 64 that receives the threaded end 65 of a pin 66. Diametrically opposite the threaded aperture 64 is a slot 67 that houses the head of the adjustable stop 26. The end portion 59 has a reduced portion 68 and within the walls of the reduced portion 68 there are provided vent bores 70. The outer diameter of the portion 68 being of smaller diameter than the remainder of portion 59, a space 71 is formed between the inner wall of the reduced portion 18 and the outer wall of the reduced portion 68. A race of bearing 74 is received fixedly in the bore 62.

Mounted for slidable reciprocating movement in the bore 58 of the sleeve 56 is a cylindrical member 75 having a head 76, a bore 77 in the head, a hollow portion 78, a wall 79 having a bore 80, and a diametrical slot 80' for passing the pin 80'', the lower end of the cylinder being provided with a flange 81. The mouth of a bore 73 receives a closure cap 82 having a flange 83 and a recess 84, the flange 83 engaging the flange 81 of the cylindrical member 75. In the head 76 there is provided a threaded bore 85 that receives the threaded shank 86 of a lever arm 87, the opposite end of the arm being provided with a knob 88 that is secured to the arm by a screw 89. Within the end portion 60 is a spring 90 that encompasses the cylindrical member 75, one end of the spring engaging the seat 72, the opposite end of the spring engaging the inner face of the flange 81.

Within the sleeve 75 there is mounted a tubular member 91 having an upper portion 92 and a lower portion 93. The upper portion 92 is provided with a slot 94 and a triangular shaped flange 95, a half portion of the tubular member diametrically opposite the slot 94 being cut away. The tubular member has an annulus 96, the lower face of which rests on the top face of the bearing 74. The upper portion 92 of the tubular member 91 is encompassed by the race of bearing 74, the lower reduced portion 93 passing through the bore 77 and terminating adjacent the lower wall of the head 76 and it is to be noted that the bore 77 is of greater diameter than the reduced portion 93. In the upper bore 69 there is positioned a retaining dust cap 99 having a bore 100 that engages the portion 92 of the member 91. The cap 99 is provided with a recessed bore 101 that receives the annulus 96.

Within the tubular member 91 there is mounted for slidable movement a rod 102 that is provided with annuli 103, 104 and 105 (Fig. 6), the rod extending downwardly through the tubular member, the end 106 of the rod 102 terminating adjacent the wall 79. The lower portion 106 of the rod 102 is split as indicated by the numeral 107 and it is provided with an internal threaded portion 108 that receives the threaded portion 109 of a rod 110, that has an annulus 111 adapted for engagement with the wall 79, the rod 110 adapted for slidable movement through the aperture 112 in the guide closure dust cap 82. The lower portion 113 of the rod 110 is of a reduced diameter, the end 114 having a tapered point. To the annulus 105 is mounted a U-shaped member 115 that is secured to the annulus by a screw 116 as shown in Fig. 6, the U-shaped member having legs 117 and arms 119, the legs being provided with an aperture 120. Interposed between the legs 117 is a pivoted sight member 121 that comprises a base portion 122 in the form of an arm, the end of the arm terminating in a tongue 123 that is in engagement with the flange 95 of the tubular member 91. Extending vertically from base portion 122 is a rod portion 123' that is provided with an aperture that receives a pivot pin 124, the pivot pin having reduced pintles 125 that engage the apertures 120 in the legs 117 of the U-shaped member 115. The movable sight 121 has an enlarged portion 126, a reduced upper portion that merges into a tapered portion 127, the end of the tapered portion being provided with a sphere 128. Convoluted around the pivot pin 124 is a spring 129 having one leg 130 secured to the rod portion 123', the leg 131 being secured to one leg of the U-shaped member at 132. A cover cap 133, having an internal diameter greater than the reduced portion 18 of cylindrical housing 17, is positioned over the tubular portion 18 of the member 17 and it is secured in place by a bolt 134 that passes through an aperture in the top of the cap 133 and is received in a threaded aperture in one of the arms 119 of the U-shaped member 115. On the top face of the cover cap 133 is a block member 135 that is provided with a groove 136 in which groove is mounted a ship model 137. The cover cap 133 is provided with a diametrical slot 138 that is of a width greater than the diameter of the lower portion 126 of the sight 121.

Figure 3:
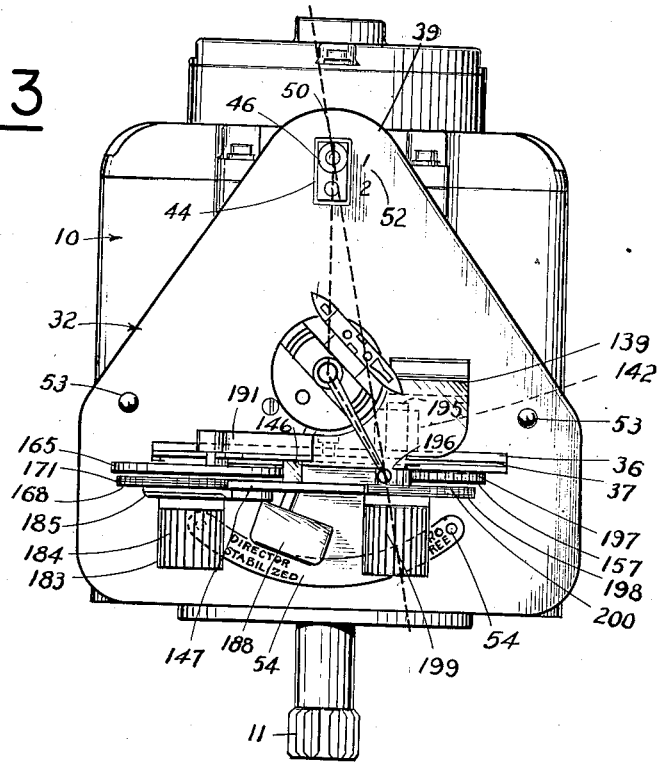
Fig. 3 is a top plan view of Fig. 1.

On the plate 32 and secured thereto by any suitable means is an L-shaped bracket 139 that is provided with a track-way groove 140 that is in spaced alignment with the groove 37. Mounted for slidable movement in the grooves 37 and 140 is a plate member 141 having a bearing 142 that may be integral with the plate member, the top of the plate member having a cut out portion 143 that engages the groove 140, the cut out portion terminating adjacent the ends of the plate, the projecting ends forming stops 144 and 145 for limiting the movement of the plate member 141. Secured to the plate member 141 and held in spaced relation therefrom by a block 146, as shown in Fig. 3 is a plate member 147 having side walls 148 and 149 that are approximately of semi-circular configuration and in which are mounted brake shoes 151 and 152. The front face of the plate 147 is provided with graduations 153 that are adjacent the side wall 148, and adjacent the graduations 153 are indicia 154 that read in knots from 100 to 250, and a letter V. The face is further provided with an arrow 155 that is adjacent the side wall 149.

Secured to the bar member 36 by screws 156 is a rack-bar plate 157. The slidable plate member 141 is provided with an aperture 158 in which is rigidly mounted one end 159 of a tubular shaft member 160. The shaft 160 has a reduced portion 161, a bore 162, an aperture 163 and a bore 164. Rotatably secured to the shaft portion 161 is a disc 165, the disc having a helical slot 166, and a pin 167 that is anchored in the disc 165 by any suitable means. Mounted on the shaft 160 and in spaced relation from the disc 165 is a dial 168 having an arcuate slot 169 through which the pin 167 passes. The dial 168 is further provided with a stud 170 and a circumferential groove 171 that is engaged by the brake shoes 151. The face of the dial 168 is provided with graduations 172, the letter R standing for "range" and an arrow for the altitude scale, and adjacent the graduations are indicia 173 that read in hundreds of yards from 8 to 24, i. e., for values of R from 800 to 2400 yards. Within the bore 164 is a spring 174 that is held in the bore by a bolt screw 175, the head 176 of the bolt screw being housed in the bore 162 and it is to be noted the outer face of the head 176 of the bolt screw is normally coplanar with the end wall 177 of the shaft member 160. The end portions 178 of the bolt screw 175 passes through the aperture 179, the threaded portion 180 engaging a threaded aperture 181 in a disc 182 that is secured to a slidable cap 183 in any suitable manner. The cap 183 has a knurled knob 184, a semi-circular dial portion 185 and a quadrant portion 186 that is provided with the letter H standing for "height," or altitude. The edge 187 of the dial 185 is provided with graduations 188 and with numerical indicia 189 that are read in hundreds of feet, the graduations being spaced for altitudes from 80 to 400. The rear face of the quadrant 186 is provided with sockets 190 that are adapted for engagement with the stud 170. To the rear face of the plate member 141 there is mounted an arm 191 that is held to the plate for pivotal movement by a pivot 192, the lower face of the arm engaging the pin 66. The arm 191 is provided with a finger 193, and secured to and disposed at right angles to the finger is a pin 194 that engages the helical groove 166 for a purpose to be later described. In the bearing 142 is mounted a shaft 195 that carries a gear 196 that engages teeth 197 of the rack bar plate 157. A dial 198 having a knob 199 is fixedly mounted on the shaft 195, the circumferential edge of the disc having a groove 200 that receives the brake shoes 152. The front face of the dial is provided with graduations 201 and indicia 202 that comprise the S scale calibrated in knots of target speed from 0 to 45.

The adaptor 12 comprises a cylindrical body 203 having an annular collar 204 and an axial bore 205. In the body 203 is a threaded bore 206 that is in communication with the bore 205, that receives the male threaded shank 207 of a pipe 208, the opposite end 209 of the pipe having internal threads (not shown) for connection to an air suction line to provide a flow of air into the gyro case for operating the gyro in a well known manner. The collar 204 is provided with slots 210 having an L-shaped portion 211 for the purpose of cooperating with the studs 31 on cylinder 17 to form a bayonet joint. In the bore 205 is positioned a spring 212, the lower portion of the spring seating in a recess 213, the upper portion of the spring engaging the end wall 214 of the cylinder 17. Encircling the collar 204 is a sponge rubber gasket 215, the lower face of the gasket seating on the face 216 of the body 203. The replacement cap 217 shown in Fig. 11 includes a cylindrical plug portion 17' insertible into the adaptor collar 204 and radially projecting pins 31' cooperating with the bayonet slots 210 in the usual manner.

In the operation of the device, the torpedo director is mounted to the gyroscope in the following manner, the lower portion 30 of the cylinder 17 is inserted into the collar 204 of the mounting post 12, and during the insertion, the rod portion 110 is received in a friction grip bearing P in the gyro gimbal Q, the studs 31 being positioned in vertical alignment with the slots 210 in the collar 204. When the studs are in alignment with the slots 210 a downward push is exerted on the dust cover 55, this downward push compresses the spring 212 and the director at this point is turned clockwise until the front of the plate 32 is parallel with the front of the gyroscope, the studs 31 engaging the notches in the ends of the L-shaped portions 211 of the slots 210. The director assembly is held in this position by the spring 212.

Figure 7:
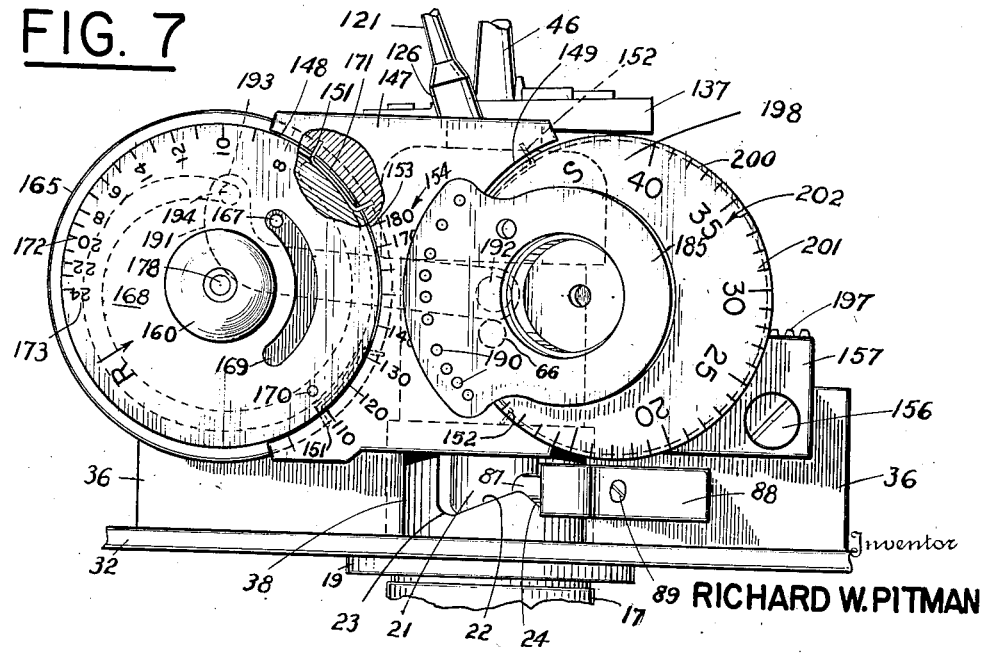
Fig. 7 is a front elevational view of the director, portions being shown broken and fragmentary, an outer quadrant shaped dial portion being removed and inverted to illustrate bores in the rear face, the broken section illustrating one of the brake shoes.
Figure 4:
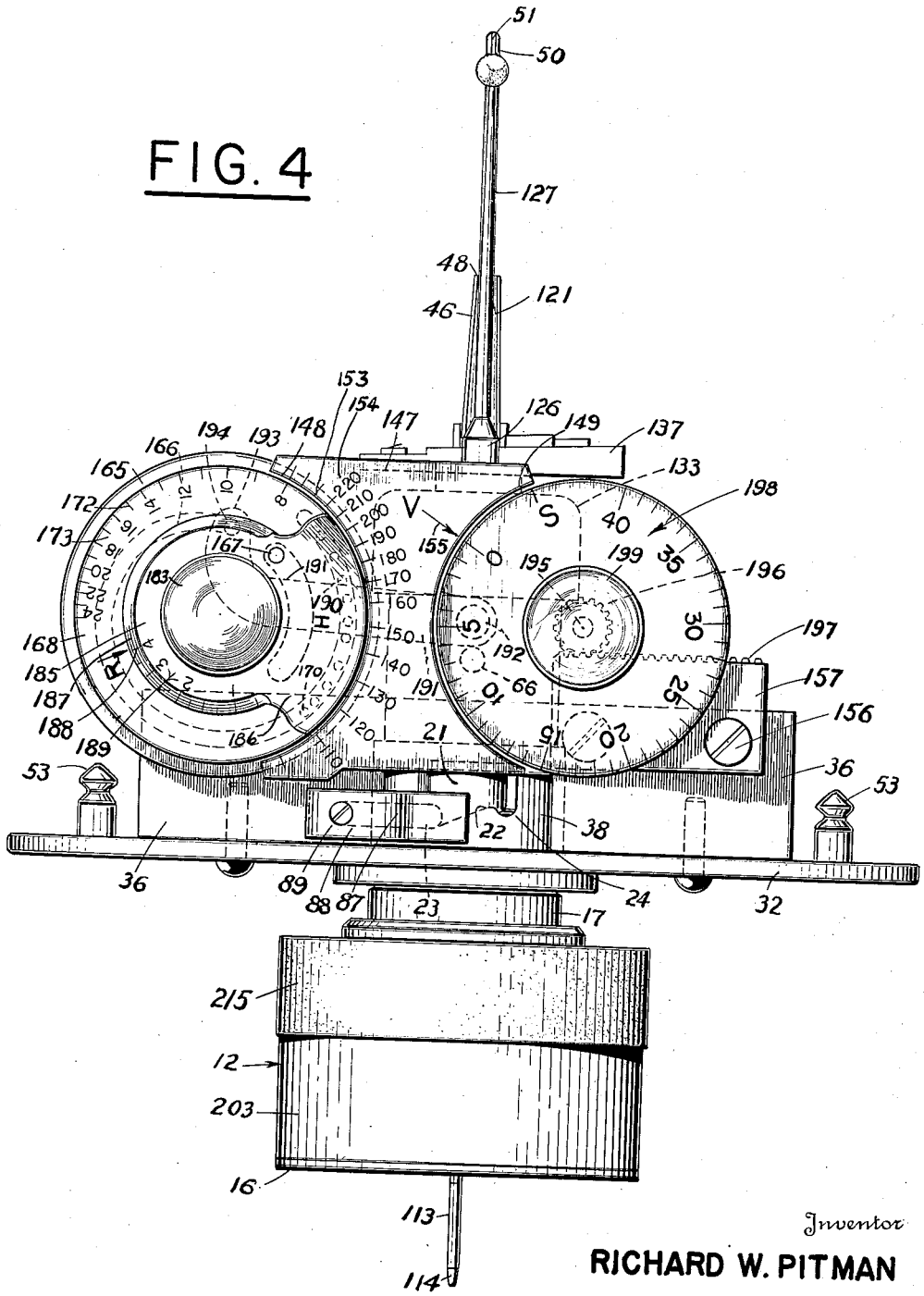
Fig. 4 is a front elevational view of the torpedo director and gyro mounting adaptor.

The lever knob 88 permits the use of the gyroscope as a directional indicator when the lever is pushed to the right, which is the gyroscope free position, as indicated on the plate 54, and this action lifts the end of pin 110 from contact with the grip bearing P in the gyro gimbal. During the movement of the lever arm 87 the following action takes place: the arm 87 rides the inclined wall 22 of the cam slot 21 until it drops into the notched portion 24 as shown in Fig. 7 of the drawings, the member 75 rotates upwardly and in a spiral direction, bringing the wall 79 in contact with the annulus 111 thereby lifting the rod 102, U-shaped member 115, cap member 133 and rear sight member 121. The movement of the above parts disengages the end 114 of rod portion 113 from the friction bearing in the gyro gimbal.

When the lever knob 88 is pushed to the left, which is the gyro stabilized position as indicated on the plate 54, the director is connected to the gyroscope through the movement and contact of the following parts. The arm 87 rides the inclined wall 22 of the cam slot 21 and drops into the notched portion 23 during movement of the lever arm, the member 75 to which the arm 87 is connected, spirally turns and moves downwardly through the action of the spring 90, the rods 102 and 110 being forced downwardly through the action of the spring 129 that forces the end 114 of rod portion 113 into gripping relation with the friction bearing in the gyro gimbal.

As shown in the drawings, the setting dials are three in number; the two on the left 168 and 185 are in stacked relation with the disc 165 on the shaft 160, and these dials by adjustment relatively to each other and to the scale 154 on plate 147, are for setting the flight-constants to allow for the airborne travel of the torpedo, while the dial on the right 198 is for the target-speed setting dial.

The three airborne correction scales from inside out 189, 173 and 154 are for setting H, R and $V_g$ where:

H=altitude, in feet, of the torpedo at moment of release.

R=run, or future range, or slant range, or torpedo traverse; i. e., the actual horizontal air plus water travel of the torpedo between release and collision with the target.

$V_g$=the ground speed of the torpedo plane along the run, at the moment of release of the torpedo.

The H-scale is graduated in feet from 80 to 400 and is set to the index by pulling out the knurled knob 184 until the stud 170 is free from the apertures 190, and turning the knob until the proper altitude indicated on the scale 189 falls on the index or arrow point on the dial 168. When the knob is released, the scale will settle into position, and be locked to the dial 168 by one of the apertures 190 engaging the stud 170.

For the R-scale or $V_g$ scale there is no index, these circles being set by setting the proper values opposite each other. As previously described, the R-scale is graduated in hundreds of yards, from 8 to 24, i. e., for values of R from 800 to 2400 yards. The $V_g$ scale is graduated in knots from 100 to 250.

For a torpedo launched at a distance of 1800 yards from the collision point, from a plane traveling at a ground speed of 200 knots, the 18 on the R-scale is set opposite the 200 of the $V_g$ scale. In all directors, the $V_s$ or target-speed dial is calibrated in knots from 0 to 45.

When an attack is to be made, the torpedo plane will presumably be at some distance from the prospective target and the gyroscope 10 will be in use as a directional indicator. The first step in the attack is to engage the director 12 with the gyroscope 10 by throwing the lever knob 88 to the left as far as it will go, this being the director stabilized position. The speed and course of the target must next be estimated, the target-speed in knots is set on the $V_s$ dial 198, the target course is set by rotating the gyroscope knob 11 in pushed in or gyro-caged position until the ship model 137 on the dust cap 133 of the rear sight post 121 is aligned parallel with the target with the same heading. When the gyroscope 10 is uncaged by pulling knob 11 out, the course and heading of the target as represented by the ship model will be stabilized by the gyro. If, during the course of the next few moments, while preparing for the run, the target speed or course should seem to have been incorrectly estimated, the director may be reset by use of the knob 11 without interfering with any other settings being made. The altitude at which the torpedo is to be released is preferably planned in advance and the H-dial 185 set accordingly. It is much easier to alter the values of run or ground speed, after the run has been started, than to change the H-setting.

Likely values of the future range and ground speed, both for the moment of release, are next set by setting the proper values on the R and $V_g$ scales opposite each other.

The director with values set in and stabilized by the gyroscope 10 is maintaining the direction and speed of the target. If the attack can be made as planned, the procedure is as follows: The actual target is aligned with the sights 49 and 121 by flying the plane in the proper direction. If enemy resistance becomes annoying, the torpedo plane may be flown any way deemed desirable, while approaching in a general way the desired release point; the director will continue to indicate the solution of the collision problem.

As the torpedo plane approaches the proper value of the future range, the pre-set altitude and ground speed should be attained as quickly as possible. The course of the target should be check with the ship model 137 on the director, and, if necessary, a last adjustment of this variable should be made with the knob 11 by caging the gyro.

When the proper release-point has been reached the target must be lined up with the sights 49 and 121, whereby the axis of the plane (and hence of the torpedo) will be directed toward the collison point; and the torpedo may then be released.

With the director in stabilized position, the rod 110 is in frictional contact axially with the gyro gimbal and movement of the knob 11 in its gyro caged position in a clockwise or counterclockwise direction imparts turning movement to the following members, rod 110, rod 102, U-shaped member 115, cap 133 and rear sight 121, whereby the ship model 137 may be brought in parallel alignment with the target with the same heading, for the purpose described above.

Target speed in knots is set on the $V_s$ dial 198 as follows: Assuming that the 0 on the dial 198 is in line with the arrow V and that the dial 198 is to be set for a 40 knot target speed, the dial is rotated in a clockwise direction until the numeral 40 is in line with the arrow V. As a result of movement of the dial, the gear 196 on the shaft 195 is rotated and engages the teeth in the rack bar plate 157, imparting movement to the slidable plate member 141, the plate with all the dials mounted on it moving to the right. The arm 191 that is privotally mounted on the plate 141 and disposed at an inclined angle, is in engagement with the pin 66 that is secured to the sleeve member 57, the sleeve member 57 being urged upwardly against the lower edge of arm 191 through the action of the spring 90. As pin 66 is moved, sleeve 57 moves member 93, member 95 causing sight member 121 to move on its pivot 124 under the tension of the spring 129. Adjustment of the target speed setting thus adjusts the leverage of arm 191 acting on pin 66 to affect the amount of displacement of the rear sight 128.

The altitude at which the torpedo is to be released, when determined, is set on the H-dial. To do this the knob 183 is pulled outwardly and rotated either in a clockwise or counterclockfise direction until the determined number of feet in hundreds on the H-scale is in line with the arrow or index on disc 168. By way of example, if the torpedo is to be released at 200 feet, the knob is turned until the number 2 mark on the scale is in line with the arrow on dial 168, and then released, whereupon the proper socket 190 will accommodate the pin 170 to lock the dial in proper relative position.

In this setting the following operation takes place, as the knob 183 is pulled out, which is integral with the H-dial 185, one of the sockets 190 therein is disconnected from the pin 170 on the dial 168. The H-dial is connected to the disc 165 by the pin 167 and as the H-dial 185 is rotated in either direction the disc 165 is also rotated, thereby imparting movement to the arm 191 through the pin 194 that engages the helical groove 166, in the disc 165. This movement of the arm 191 effects either an upward or downward movement of the pin 66 carried by the cylinder 56 depending upon the direction of rotation of the H-dial 185. As the cylinder 56 moves up or down, rear sight 121 is moved either away from or toward a vertical position, the following members causing this movement; the tubular member 91 and its flange 95 carried by the cylindrical member 56, the portion 122 of the rear sight 121 which is held in contact with the flange 95 by the spring 129, thereby causing the rear sight 121 to move on its pivot 124 as the pin 66 is raised or lowered.

For setting the knob 183 for the range between the release and collision with the target and the ground speed of the aircraft, the dials 185, 168 and disc 165 are in locked engagement, the dial 185 being locked to dial 168 through pin 170. Disc 165 is in locked engagement with dial 185 by the pin 167 carried by disc 165 passing through the arcuate slot 169 in dial 168, and projecting into a registering aperture in dial 185.

Assuming the range to be 1800 yards and the ground speed of the aircraft to be 200 knots, the knob 183 is rotated until 18 on dial 168 is opposite 200 on the $V_g$ or ground speed scale on plate 147. The movement, during this adjustment, of the dials 185, 168 and disc 165 as a unit affects the arm 191, pin 66 and rear sight 121 in the same manner as previously described during the torpedo altitude setting but by an amount corresponding to the correction (Q) of the target speed vector to compensate for the airborne travel of the torpedo under the herein assumed conditions.

As shown in Figs. 1 to 7, the front sight post in the position marked "1" at 52 on the base plate 39, is mounted at a distance from the rear sight axis representing the torpedo run vector of a torpedo having a water speed of 40 knots. Provision is made, however, for reversing the mounting of this front sight with respect to the two openings 40 and 41 in the base plate 39 by removing the post from the position shown and reinserting it so that the stud 43 goes through the opening 41 and the pin 42 is in the opening 40. With the post mounted in this position which is indicated by the numeral "2" inscribed at 52 on the base plate 39, the distance between the front sight post and the axis of the rear sight is proportionately decreased to represent the shorter torpedo run vector corresponding to a torpedo having a water speed of 33.5 knots. These are the speeds of the two standard torpedoes in general use. However, the front sight post may be made adjustable as to its distance from the rear sight axis so as to conform to any speed of torpedo, as indicated by the slidable mounting connection shown in Fig. 10.

The helical cam groove 166 on plate 165 is formed so as to move the lever 191 and therefore the pin 66 and shoulder 95 and thereby also the rear sight ball 128 in accordance with the correction Q necessary to be applied to the target run which is represented by the horizontal distance between the sight ball and the vertical axis of the rear sight. As previously explained, the correction factor Q is directly proportional to the square root of the altitude, inversely proportional to the future range or torpedo run, and directly proportional to the difference between airplane speed and torpedo water speed. These proportions are properly scaled in the instrument with respect to the shape of the helical cam slot 166, the scale of values of the several scales used, and the representative distance between the axes of the front and rear sights, so that accurate results may be obtained in any positions of the adjustments.

The present disclosure is a duplicate of that described in copending application Serial No. 658,724 of Robert M. Freeman for Torpedo Directors, filed April 1, 1946, which includes the invention of the present applicant as defined in the appended claims. This invention comprises the novel compact mechanism for computing airborne correction directly in the instrument and its linkage to the dirigible rear sight post.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

What is claimed is:

1. For use with a directional gyro provided with a member stabilized in azimuth, a torpedo director including a normally vertical shaft mounted for angular orientation about its axis and connected to said member for stabilization in any one of a plurality of angularly oriented positions representative of different target directions, a sight arm pivotally connected to said shaft for swinging movement into any one of a plurality of positions of angular adjustment relative to said shaft, a sleeve relatively reciprocable coaxially of said shaft and adapted through said relative movement to control the angular position of said sight arm relative to said shaft, manually adjustable means for setting the reciprocable sleeve and thereby disposing said sight arm in an angular position relative to said shaft representative of target speed, and a normally vertical sight spaced from said pivoted sight arm a distance representative of torpedo speed.

2. For use with a directional gyro including a housing and provided with a member stabilized in azimuth, a torpedo director including a bracket adapted to be attached to the gyro housing, a normally vertical shaft mounted in said bracket for angular orientation about its axis and connected to said gyro member for stabilization in any one of a plurality of angularly oriented positions representative of different target directions, a sight arm pivotally connected to said shaft for swinging movement into any one of a plurality of positions of angular adjustment relative to said shaft, a sleeve reciprocable in said bracket coaxially of said shaft and adapted to control the angular position of said sight arm relative to said shaft, manually adjustable means carried by said bracket for setting the reciprocable sleeve and thereby disposing said sight arm in an angular position relative to said shaft representative of target speed, and a normally vertical sight releasably fixed to said bracket and spaced from said pivoted sight arm a distance representative of torpedo speed.

3. For use with a directional gyro including a housing and provided with a member stabilized in azimuth, a torpedo director including a bracket adapted to be attached to the gyro housing including a normally vertical hollow cylindrical portion, a sleeve reciprocable in said cylindrical portion, a shaft coaxially mounted in said sleeve for angular orientation about its axis and connectible to said gyro member for stabilization in any one of a plurality of angularly oriented positions representative of different target directions, a sight arm pivotally connected to said shaft for swinging movement and disposed through engagement by said reciprocable sleeve in any one of a plurality of positions of angular adjustment relative to said shaft, manually adjustable means carried by said bracket for setting the reciprocable sleeve and thereby disposing said sight arm in an angular position relative to said shaft representative of target speed, and a normally vertically sight releasably fixed to said bracket and spaced from said pivoted sight arm a distance representative of torpedo speed.

4. For use with a directional gyro including a housing and provided with a member stabilized in azimuth, a torpedo director including a bracket adapted to be attached to the gyro housing including a normally vertical hollow cylindrical portion, a sleeve reciprocable in said cylindrical portion, a shaft mounted in said sleeve for angular orientation about its axis and connectible to said gyro member for stabilization in any one of a plurality of angularly oriented positions representative of different target directions, a sight arm pivotally connected to said shaft for swinging movement and disposed through engagement by said reciprocable sleeve in any one of a plurality of positions of angular adjustment relative to said shaft, said sleeve being provided with a projection, a bar supported for horizontal reciprocatory movement on said bracket, a lever pivoted to said bar for reciprocatory movement therewith and for vertical swinging movement, said lever engaging said projection for controlling the vertical position of said sleeve, manually operable means setting the bar in any one of a plurality of horizontally spaced positions representative of target speed, manually operable means setting the lever in any one of a plurality of angularly spaced positions representative of airplane speed, altitude and torpedo run, and a normally vertical sight spaced from said pivoted sight arm a distance representative of torpedo speed.

5. The torpedo director specified in claim 4, said lever setting means comprising an axle carried by said bar, a rotary cam mounted for angular displacement on said axle and adapted to angularly position said vertically swingable lever, an airborne correction dial rotatably mounted on said axle for angular adjustment, and means releasably connecting said correction dial to said cam in any selected one of a plurality of angularly spaced relationships.

6. The torpedo director specified in claim 4, said lever setting means comprising an axle carried by said bar, a rotary cam mounted for angular displacement on said axle and adapted to angularly position said vertically swingable lever, first and second airborne correction dials rotatably mounted on said axle, for angular adjustment and provided with range and altitude correction indicia respectively, means transmitting rotary movement of said second correction dial to said cam, and means releasably connecting said second correction dial to said first correction dial in any selected one of a plurality of angularly spaced relationships.

RICHARD W. PITMAN.

REFERENCES CITED

The following references are of record in the file of this patent:

UNITED STATES PATENTS

| Number | Name | Date |
|---|---|---|
| D. 144,108 | Freeman | Mar. 12, 1946 |
| 1,997,303 | Le Prieur et al. | Apr. 9, 1935 |
| 2,317,059 | Hilton et al. | Apr. 20, 1943 |
| 2,384,036 | Klemperer et al. | Sept. 4, 1945 |
| 2,421,749 | Freeman | June 10, 1947 |
| 2,534,258 | Gallery | Dec. 9, 1950 |
| 2,547,654 | Moore | Apr. 3, 1951 |
| 2,557,103 | Hammond | June 19, 1951 |

FOREIGN PATENTS

| Number | Country | Date |
|---|---|---|
| 870,388 | France | Dec. 12, 1941 |